(12) United States Patent
Daley et al.

(10) Patent No.: US 11,853,648 B2
(45) Date of Patent: Dec. 26, 2023

(54) COGNITIVE AND INTERACTIVE SENSOR BASED SMART HOME SOLUTION

(71) Applicant: INTERNATIONAL BUSINESS MACHINES CORPORATION, Armonk, NY (US)

(72) Inventors: Stan K. Daley, Atlanta, GA (US); Zhong-Hui Lin, Dublin, OH (US); Tao Liu, Dublin, OH (US); Dean Phillips, South Lyon, MI (US); Kent R. VanOoyen, Greensboro, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 17/232,697

(22) Filed: Apr. 16, 2021

(65) Prior Publication Data
US 2021/0232363 A1    Jul. 29, 2021

Related U.S. Application Data

(63) Continuation of application No. 15/618,426, filed on Jun. 9, 2017, now Pat. No. 10,983,753.

(51) Int. Cl.
*G10L 15/22* (2006.01)
*G06F 3/16* (2006.01)

(52) U.S. Cl.
CPC ................... *G06F 3/167* (2013.01)

(58) Field of Classification Search
None
See application file for complete search history.

(56) References Cited

U.S. PATENT DOCUMENTS

| 5,949,854 | A | 9/1999 | Sato |
| 6,047,257 | A | 4/2000 | Dewaele |
| 6,138,100 | A | 10/2000 | Dutton et al. |
| 6,424,369 | B1 | 1/2002 | Adair et al. |
| 6,377,825 | B1 | 4/2002 | Kennedy et al. |
| 6,549,789 | B1 | 4/2003 | Kfoury |

(Continued)

FOREIGN PATENT DOCUMENTS

WO    9934339    7/1999

OTHER PUBLICATIONS

Harman and IBM Watson Internet of Things Introduce Cognitive Rooms that Bring Connected Experiences to the Consumer, News Provided by IBM, www.ibm.com/iol, Apr. 19, 2017; 3 pages.

(Continued)

*Primary Examiner* — Jakieda R Jackson
(74) *Attorney, Agent, or Firm* — Daniel Yeates; Andrew D. Wright; Calderon Safran & Cole P.C.

(57) ABSTRACT

Systems and methods for smart sensors are provided. A smart sensor includes: a case; a power adapter configured to be plugged directly into an electrical outlet; a computer processor; a microphone; a speaker; a camera; at least one sensor; a control switch; a sync button; a USB port; and a memory storing: an operating system; a voice control module; a peer interaction module; a remote interaction module; and a cognitive module. In embodiments, the power adapter includes prongs that extend from a back side of the case, and the microphone, the speaker, the camera, and the at least one sensor are on a front side of the case opposite the back side of the case.

20 Claims, 7 Drawing Sheets

(56) References Cited

U.S. PATENT DOCUMENTS

| | | |
|---|---|---|
| 6,587,700 B1 | 7/2003 | Meins et al. |
| 6,604,681 B1 | 8/2003 | Burke et al. |
| 6,678,535 B1 | 1/2004 | Narayanaswami |
| 6,711,419 B1 | 3/2004 | Mori |
| 6,952,676 B2 | 10/2005 | Sherman |
| 6,988,070 B2 | 1/2006 | Kawasaki et al. |
| 8,340,975 B1 | 12/2012 | Rosenberger |
| 8,953,889 B1 | 2/2015 | Worley, III et al. |
| 9,020,825 B1 | 4/2015 | Garber |
| 9,282,096 B2 | 3/2016 | Goldstein |
| 10,255,422 B1 | 4/2019 | Last et al. |
| 10,671,721 B1* | 6/2020 | Otvagin ............... H04L 63/145 |
| 2005/0108646 A1 | 5/2005 | Willins et al. |
| 2008/0182518 A1 | 7/2008 | Lo |
| 2008/0263451 A1 | 10/2008 | Portele et al. |
| 2009/0150156 A1 | 6/2009 | Kennewick et al. |
| 2009/0164219 A1 | 6/2009 | Yeung et al. |
| 2009/0182560 A1 | 7/2009 | White |
| 2009/0191846 A1 | 7/2009 | Shi |
| 2009/0265163 A1 | 10/2009 | Li et al. |
| 2009/0273563 A1 | 11/2009 | Pryor |
| 2009/0315827 A1 | 12/2009 | Elvesjö et al. |
| 2010/0229241 A1 | 9/2010 | Liu et al. |
| 2011/0202910 A1 | 8/2011 | Venkatakrishnan et al. |
| 2011/0218812 A1 | 9/2011 | Patel |
| 2011/0276327 A1 | 11/2011 | Foxenland |
| 2011/0282666 A1 | 11/2011 | Washio et al. |
| 2011/0298585 A1 | 12/2011 | Barry |
| 2012/0065971 A1 | 3/2012 | Schrager |
| 2012/0086568 A1 | 4/2012 | Scott et al. |
| 2013/0120138 A1 | 6/2013 | Hicks, III |
| 2013/0159939 A1 | 6/2013 | Krishnamurthi |
| 2013/0311612 A1 | 11/2013 | Dickinson |
| 2013/0339015 A1 | 12/2013 | Lee et al. |
| 2014/0052437 A1 | 2/2014 | Longe et al. |
| 2014/0108019 A1 | 4/2014 | Ehsani et al. |
| 2014/0122074 A1 | 5/2014 | Karmarkar et al. |
| 2014/0222432 A1 | 8/2014 | Ahn et al. |
| 2014/0244712 A1 | 8/2014 | Walters et al. |
| 2014/0310002 A1 | 10/2014 | Nitz et al. |
| 2015/0002808 A1* | 1/2015 | Rizzo, III .......... A61N 1/36046 351/158 |
| 2015/0006176 A1 | 1/2015 | Pogue et al. |
| 2015/0035680 A1 | 2/2015 | Li et al. |
| 2015/0086034 A1 | 3/2015 | Lombardi et al. |
| 2015/0097689 A1 | 4/2015 | Logue et al. |
| 2015/0106086 A1 | 4/2015 | Oh et al. |
| 2015/0156030 A1 | 6/2015 | Fadell et al. |
| 2015/0188724 A1* | 7/2015 | Kim ...................... H04L 12/282 340/3.71 |
| 2015/0287422 A1 | 10/2015 | Short et al. |
| 2015/0348554 A1 | 12/2015 | Orr et al. |
| 2015/0348569 A1 | 12/2015 | Allam et al. |
| 2015/0382104 A1 | 12/2015 | Hogan et al. |
| 2016/0019397 A1 | 1/2016 | Peterson et al. |
| 2016/0019887 A1 | 1/2016 | Kim et al. |
| 2016/0034305 A1 | 2/2016 | Shear et al. |
| 2016/0044447 A1 | 2/2016 | Tetreault et al. |
| 2016/0063997 A1 | 3/2016 | Nemala et al. |
| 2016/0077794 A1 | 3/2016 | Kim et al. |
| 2016/0098992 A1 | 4/2016 | Renard et al. |
| 2016/0125882 A1 | 5/2016 | Contolini et al. |
| 2016/0154089 A1 | 6/2016 | Altman |
| 2016/0155443 A1 | 6/2016 | Khan et al. |
| 2016/0225372 A1 | 8/2016 | Cheung et al. |
| 2016/0241976 A1 | 8/2016 | Pearson |
| 2016/0261425 A1 | 9/2016 | Horton et al. |
| 2016/0300468 A1 | 10/2016 | Stricker et al. |
| 2016/0314782 A1 | 10/2016 | Klimanis |
| 2016/0314785 A1 | 10/2016 | Matsuoka et al. |
| 2016/0360597 A1 | 12/2016 | Greene |
| 2016/0379638 A1 | 12/2016 | Basye et al. |
| 2017/0039359 A1 | 2/2017 | Yang et al. |
| 2017/0069321 A1 | 3/2017 | Toiyama |
| 2017/0109952 A1* | 4/2017 | Johnson ............. G07C 9/00309 |
| 2017/0178001 A1 | 6/2017 | Anderson et al. |
| 2017/0195625 A1 | 7/2017 | Mahar et al. |
| 2017/0236512 A1 | 8/2017 | Williams et al. |
| 2017/0347923 A1 | 12/2017 | Roh |
| 2017/0359722 A1* | 12/2017 | Folse ...................... G06F 21/51 |
| 2018/0046236 A1 | 2/2018 | Erturk et al. |
| 2018/0108351 A1 | 4/2018 | Beckhardt et al. |
| 2018/0113577 A1 | 4/2018 | Burns et al. |
| 2018/0358009 A1 | 12/2018 | Daley et al. |
| 2019/0210216 A1 | 7/2019 | Gupta et al. |

OTHER PUBLICATIONS

Rehman et al., "Voice Controlled Home Automation System for the Elderly or Disabled People", J_ Appl. Environ. Biol. Sci., 2014, 11 pages.

Coven!, https://www.ecoventsystems.com/, accessed Jun. 7, 2017, 2 pages.

List of IBM Patents or Patent Applications Treated as Related, dated Apr. 16, 2021, 1 page.

* cited by examiner

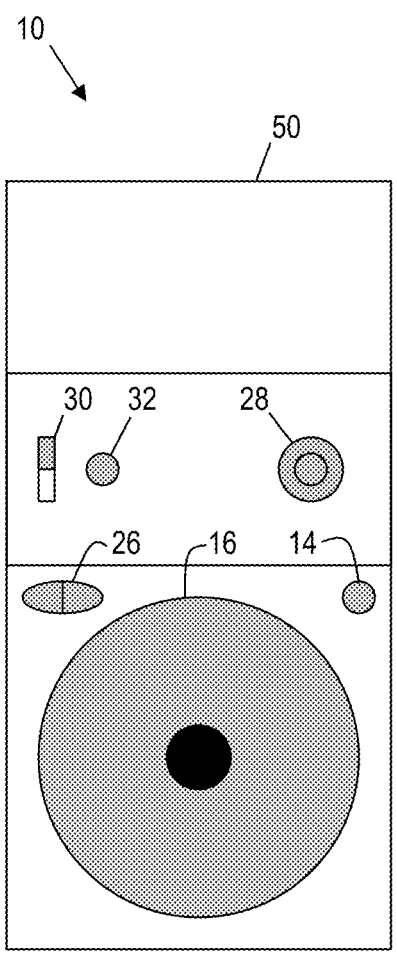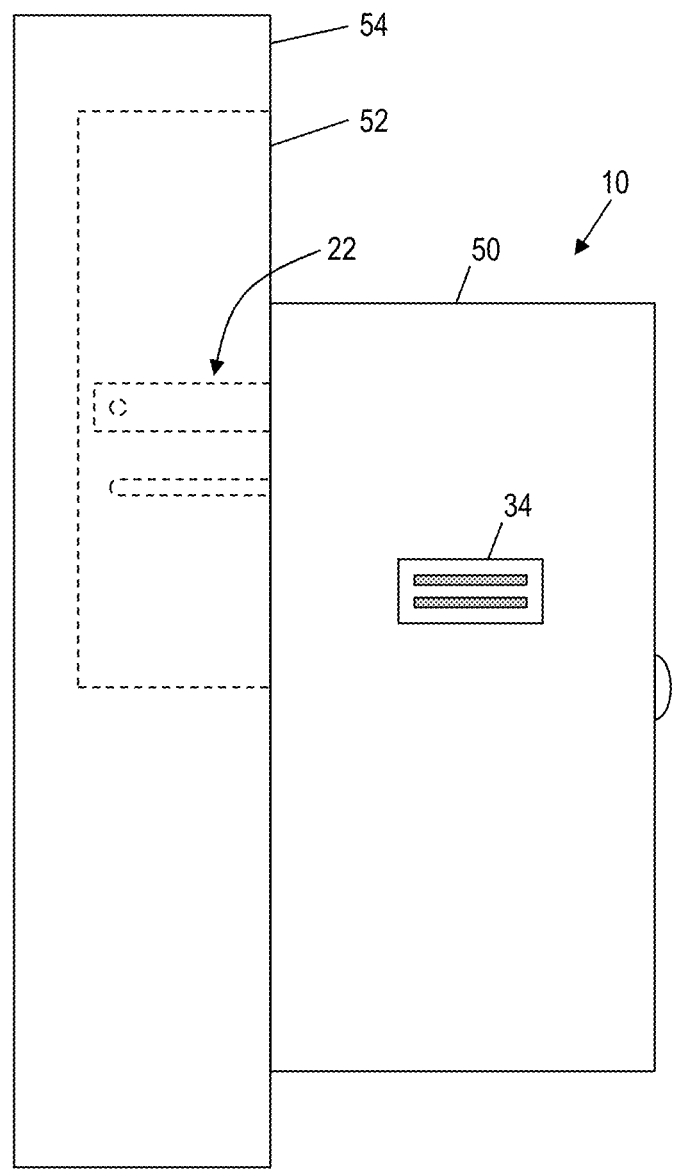

COGNITIVE AND INTERACTIVE SENSOR BASED SMART HOME SOLUTION

BACKGROUND

The present invention generally relates to cognitive devices and, more particularly, to a cognitive and interactive sensor based smart home solution.

A cognitive device (sometimes called a smart speaker) is a hardware device that facilitates user interaction with a virtual assistant (also called a smart assistant or an intelligent personal assistant). Such devices continuously listen for a wake word to be spoken by a user and perform various tasks based on voice commands from the user. For example, such devices are capable of voice controlled music playback, making to-do lists, setting alarms, streaming podcasts, playing audiobooks, and providing weather, traffic and other real time information. Such devices can also control smart devices as a home automation hub in a smart home environment.

Conventional devices do not differentiate between plural different users, and typically require the use of a power cord to plug into a power supply. For example, some devices purport to be smart devices, but in actuality are not interactive and merely take commands from a mobile app. Some smart home assistants have the ability to interact with a person, but they are limited to a single user account and aren't convenient to install in plural rooms. Some smart home devices operate on protocols to connect to an app, but their voice interaction is only possible through a separate user device.

SUMMARY

In a first aspect of the invention, there is a smart sensor comprising: a case; a power adapter configured to be plugged directly into an electrical outlet; a computer processor; a microphone; a speaker; a camera; at least one sensor; a control switch; a sync button; a USB port; and a memory storing: an operating system; a voice control module; a peer interaction module; a remote interaction module; and a cognitive module. In embodiments, the power adapter comprises prongs that extend from a back side of the case, and the microphone, the speaker, the camera, and the at least one sensor are on a front side of the case opposite the back side of the case. In this manner, the smart sensor advantageously avoids problems associated with power cords.

In embodiments, the voice control module is configured to: resolve a voice command received by the microphone; and use smart speech recognition to determine a user from plural registered users based on the voice command. The resolving the voice command may comprise determining an instruction, the smart sensor may be configured to access user data on a user device based on the determining the user, and the smart sensor may be configured to carry out the instruction based on the accessed user data. In this manner, implementations of the invention provide the advantage of performing personalized functions for a particular user from a plurality of registered users.

In another aspect of the invention, there is a smart system comprising plural smart sensors connected in a wireless mesh network. Each of the smart sensors comprises: a case; a power adapter configured to be plugged directly into an electrical outlet; a computer processor; a microphone; a speaker; a camera; at least one sensor; a control switch; a sync button; a USB port; and a memory storing: an operating system; a voice control module; a peer interaction module; a remote interaction module; and a cognitive module.

In embodiments, the system is configured to operate such that: a first one of the smart sensors is performs a function based on receiving a voice command from a user; the first one of the smart sensors and a second one of the smart sensors detect that the user moves to a location that is closer to the second one of the smart sensors than to the first one of the smart sensors; and based on the detecting, the first one of the smart sensors stops performing the function and the second one of the smart sensors starts performing the function. In this manner, the system may advantageously provide a following function for a user.

In embodiments, a first one of the smart sensors is configured to perform a first function based on a first voice command received from a first user, and a second one of the smart sensors is configured to perform a second function based on a second voice command received from a second user, with the second function being different than the first function and being performed simultaneously with the first function. In this manner, implementations of the invention provide personalized functionality for two different users.

In another aspect of the invention, there is a method of using a smart sensor system, the method comprising: receiving, by a smart sensor, a voice command at a smart sensor; resolving, by the smart sensor, the voice command to determine an instruction; determining, by the smart sensor, a registered user from plural registered users based on smart speech recognition and the voice command; accessing, by the smart sensor, user data on a user device based on the determining the registered user; and carrying out the instruction, by the smart sensor, based on the accessed user data.

In another aspect of the invention, there is a computer program product for using a smart sensor system, the computer program product including a computer readable storage medium having program instructions embodied therewith. The program instructions are executable by a computer device to cause the computer device to: receive a voice command at a smart sensor; resolve the voice command to determine an instruction; determine a registered user from plural registered users based on smart speech recognition and the voice command; access user data on a user device based on the determining the registered user; perform a cognitive analysis based on the voice command; and carry out the instruction based on the accessed user data and the cognitive analysis.

BRIEF DESCRIPTION OF THE DRAWINGS

The present invention is described in the detailed description which follows, in reference to the noted plurality of drawings by way of non-limiting examples of exemplary embodiments of the present invention.

FIGS. 2 and 3 show a front view and a side view, respectively, of an implementation of a smart sensor in accordance with aspects of the invention

DETAILED DESCRIPTION

Figure 1:
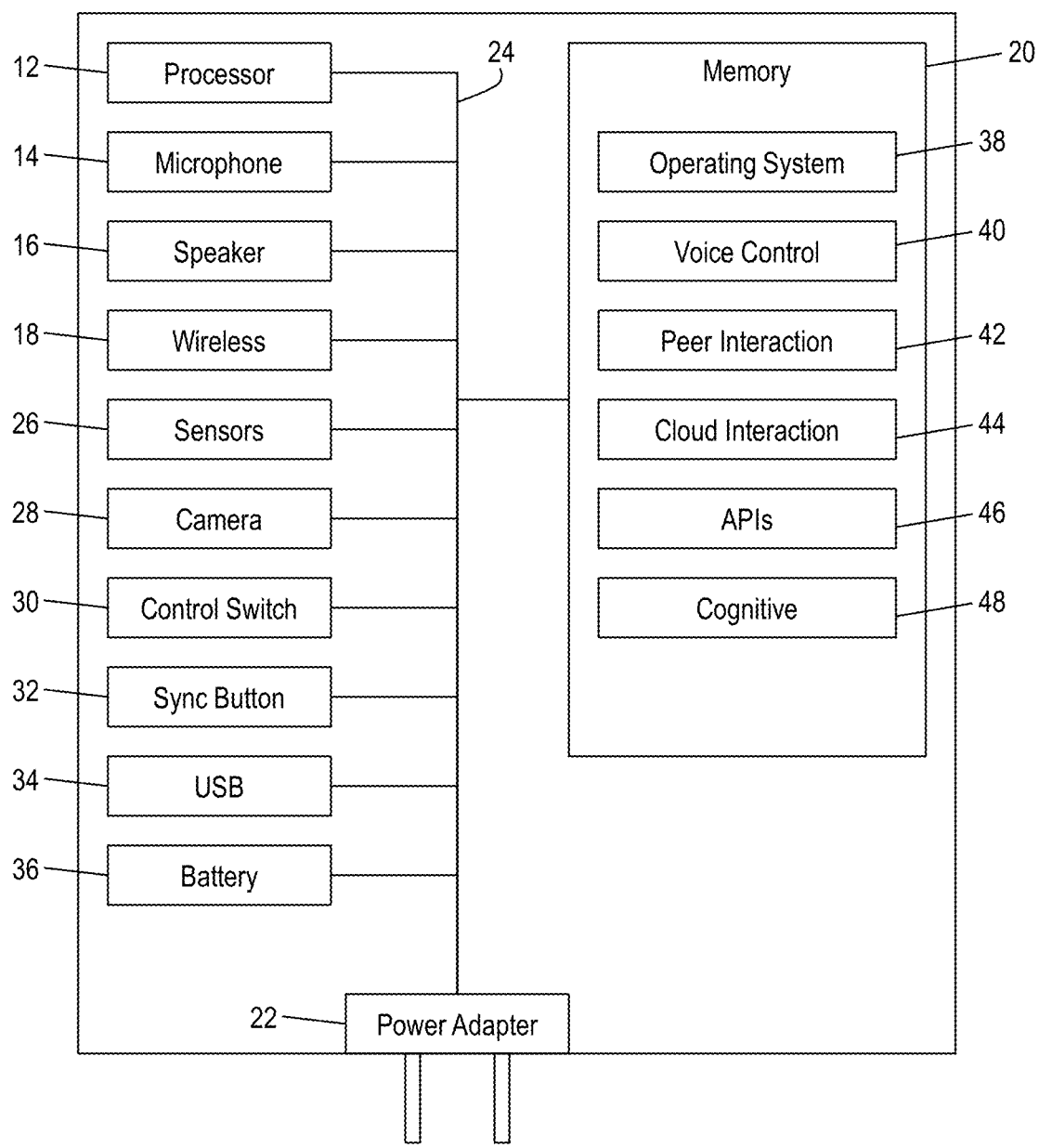
FIG. 1 depicts a smart sensor according to an embodiment of the present invention.

The present invention generally relates to cognitive devices and, more particularly, to a cognitive and interactive sensor based smart home solution. In accordance with aspects of the invention, there is a Smart Home Sensor Solution that uses power outlets, connects peer to peer to detect precise context of the user, and connects to cognitive APIs hosted in the cloud to provide intelligent interaction. In embodiments, a smart sensor is configured to receive a voice input from a user, identify the user based on smart speech recognition, and perform a function in response to the voice input and based in part on user data associated with the identified user. In embodiments, the smart sensor is configured to identify the user from plural registered users. In this manner, each user's interaction with the system is personalized based on their own data. Using smart speech recognition to identify a user and then leveraging the user's own data in performing a function provides a technical contribution over systems that are limited to interacting with only a single user.

In embodiments, the smart sensor plugs directly into a standard electrical outlet without a power cord. The smart sensor may be on a local network with other smart appliances such as televisions, thermostats, lighting systems, security systems, sprinkler/irrigation systems, health/medical monitoring devices, etc. The smart sensor may include programming (e.g., APIs) that permit the smart sensor to interface with (e.g., send data to and receive data from) the smart appliances. In this manner, a user may control the smart appliances via interaction (e.g., voice input) with the smart sensor. For example, a user may provide a voice command to the smart sensor to turn on the television, and the sensor may receive the input and send data through the network that causes the television to turn on. User devices, e.g., smartphones, tablets, laptops, desktops, etc., can connect to the local network. In this manner, a software app on a user device may be used to configure the smart sensor, register different users with the smart sensor, and expose user data stored on the user devices for use by the smart sensor.

In aspects, the smart sensor may include a cognitive computing component and/or may communicate with a cloud based cognitive computing system. In this manner, a function performed by the smart sensor, e.g., in response to a user input, may be based in part on cognitive analysis of the user input and/or the user data. In this manner, aspects of the invention provide a technical contribution of using cognitive analysis in an interactive sensor based smart home solution.

In embodiments, plural smart sensors may be arranged in a system such as a mesh network. Each respective smart sensor of the system may be plugged into a different outlet, e.g., in different rooms of a building such as a home, office, hospital, etc. In this manner, plural users may interact simultaneously with different smart sensors in the system to obtain personalized functionality. Connecting plural smart sensors that can operate independently with different users provides a technical solution to the technical problem of other devices that are limited to interacting with one user at a time.

In accordance with aspects of the invention, a system includes plural smart sensors connected in a mesh network and communicating with a cognitive computing system in a remote network such as the cloud. In embodiments, the system utilizes cognitive APIs, such as smart speech, that permit the system to recognize who is talking and use their device for base information including but not limited to contact list, music, etc. In embodiments, the system is configured to permit a user to control aspects such as volume, speed of the response language, vocabulary (e.g., depending on parameters such as age, who is interacting with the system, etc.), speech to text, text to speech, context awareness, and device management. Software in the system (e.g., stored and executed on each smart sensor) may be configured to provide one or more of voice control, peer interaction, and cloud interaction. Each smart sensor may include an embedded operating system (OS) that can be updated to add new options and/or features.

Each smart sensor of the system may include a microphone and speaker that are used to facilitate voice input and audio output, and that can additionally be configured as a monitoring system such as a baby monitor, hospital patient monitor, pet monitor, etc. Additionally or alternatively, each smart sensor of the system may be configured to communicate with wireless medical equipment, such as a heart rate monitor or patient locator, and to provide reporting data to an app at a user device, e.g., through the cloud.

Each smart sensor of the system may be configured to provide natural language question and answering. For example, the system may be on a local network that can communicate with an external network, e.g., the Internet, such that a smart sensor in the system can communicate with the cloud based cognitive computing system. In this manner, the system may provide natural language question and answering functionality based on the cloud based cognitive computing system. In embodiments, the natural language question and answering functionality may be personalized to a particular user. For example, a first user may have a subscription to a first tier of services with a natural language question and answering system, and a second user may have a subscription to a second tier of services with a natural language question and answering system. In embodiments, the smart sensor determines an identity of a user asking a question, communicates the question and the identity to the cloud based cognitive computing system. The cloud based cognitive computing system determines the user's subscription tier based on the received identity, accesses the cloud based cognitive system based on the user's subscription tier, determines an answer, and communicates the answer back to the smart sensor, which outputs the answer to the user via the speaker.

Each smart sensor of the system may be configured to detect the precise location of the user based on data obtained by at least one of a Passive Infrared Sensor/Repeater, a LiDAR sensor, and an Ultrasonic Sensor. In embodiments, the Passive Infrared Repeater/Sensor can detect motion, etc., and also send an infrared (IR) signal to a television or other device. For example, a smart sensor in the system may receive the voice command "turn on TV" spoken by a user within the vicinity of the smart sensor. Based on receiving this voice command form the user, the smart sensor may identify the user based on voice recognition, determine a television closest to the user (e.g., based on stored data defining a location of the smart sensor and locations of plural televisions in the home), determine the user's preferred program at this day and time (e.g., based on cognitive analysis of user data, such as historical viewing habits), and send a signal to the identified television to turn on and tune to the channel having the determined program. The smart sensor may send the signal to the television using the Passive Infrared Repeater.

In an exemplary usage, a group of smart sensors in the system can be configured to simultaneously play the same music through their respective speakers for whole house sound. In another exemplary usage, at least one first smart sensor may play first music while at least one second smart sensor plays second music different than the first music. For example, a first user located in a first room of a house may speak the command "play music." A first smart sensor located in the first room receives the command from the first user, identifies the first user via voice recognition, accesses the first user's music library (e.g., on a user device of the first user), and plays music from the first user's music library via the speaker of the first smart sensor. In this same example, while the first music is playing on the first smart sensor, a second user located in a second room of the house may speak the command "play music." A second smart sensor located in the second room receives the command from the second user, identifies the second user via voice recognition, accesses the second user's music library (e.g., on a user device of the second user), and plays music from the second user's music library via the speaker of the second smart sensor. In this manner, different smart sensors connected in a same system may be configured to simultaneously play different music for different users based on receiving voice commands from the different users.

Aspects of the invention are described herein as accessing and leveraging user data, e.g., data owned by one or more users registered with a smart sensor of the present invention. To the extent that implementations of the invention collect, store, or employ personal information provided by individuals (e.g., user data), it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Aspects of the invention are described herein as using one or more smart sensors for audio monitoring and/or video monitoring of physical spaces that may be occupied by one or more individuals. For example, implementations of the invention may be used as at least one of: a baby monitor, a health care monitor, a pet monitor, and a home security system. To the extent that implementations of the invention perform such monitoring, it should be understood that such monitoring shall be performed in accordance with all applicable laws concerning protection of personal information and privacy of individuals.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a smart sensor 10 according to an embodiment of the invention is diagrammatically shown. Smart sensor 10 is only one example of a suitable computing device and is not intended to suggest any limitation as to the scope of use or functionality of embodiments of the invention described herein. Regardless, smart sensor 10 is capable of being implemented and/or performing any of the functionality set forth hereinabove.

In embodiments, smart sensor 10 is a special-purpose computing device that is operational with numerous other general purpose or special purpose computing system environments or configurations. Examples of well-known computing systems, environments, and/or configurations that may be suitable for use with smart sensor 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

According to aspects of the invention, the smart sensor 10 plugs directly into an electrical outlet to allow for easy placement and constant electrical power without the worry of having a cord to trip over or the need to place in an undesirable location based on needing a platform for its placement. In embodiments, the smart sensor 10 may comprise hardware including: a built-in wireless controller; a compact speaker; a passive infrared sensor; an ultrasonic sensor; a wide angle camera configured for use in regular light (e.g., day) and low light (e.g., night); a microphone; a control switch; a sync button; and a USB port.

In embodiments, the smart sensor 10 may comprise software that is programmed to provide functionality including at least one of: each smart sensor may be listed in menu in an app and a user can control each individual smart sensor options or configure plural smart sensors as a group; wireless configuration and security; compact audio speaker can used singly or as a group; passive infrared technology allows each sensor to also be a IR repeater for television and/or other equipment; wide angle camera can be turned on or off; microphone can be turned on or off; microphone can also be used as always-on for audio monitoring, such as a baby monitor, health care monitor, pet monitor; app allows access to wireless media and/or cloud based media; control of smart home devices via application, thresholds, voice commands, and/or schedule; master control (e.g., initial user and device owner) can set up a password to allow other users to interconnect and use certain aspects of the sensor system such as their own phone book for voice command dialing and conversation, music library and song lists, alarm, etc.; view and record video from cameras; question and answer functionality powered by a cognitive computing system; flexibility to permit future add-ons such as, for example, wireless medical equipment; battery powered on-the-go smart sensor; and compatibility with existing wireless security systems.

Still referring to FIG. 1, the components of the smart sensor 10 may include, but are not limited to, one or more processors or processing units (e.g., CPU) 12, one or more microphones 14, one or more speakers 16, a wireless communication system 18, a Memory 20, a power adapter 22, and a bus 24 that couples various system components including Memory 20 to processor 12.

Bus 24 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Wireless communication system 18 provides wireless communication between the smart sensor 10 and other computing devices. Wireless communication system 18 may include a network adapter, for example. Wireless communication system 18 may include at least one antenna that is configured to provide wireless communication including, but not limited to, one or more of WiFi, Bluetooth, and Near Field Communication (NFC).

Power adapter 22 represents one or more devices that convert electrical power received from a power source, such as an electrical outlet, to a voltage that is usable by the system components. As but one example, power adapter 22 may include circuitry that converts 120 volt alternating current voltage (received from an electrical outlet) to 5 volt direct current voltage (used by the system components). Implementations of the invention are not limited to these exemplary voltages, and power adapter 22 may be configured for other voltages. Power adapter 22 may be coupled by the bus 24 to other system components such as the processor 12 and memory 20.

Still referring to FIG. 1, smart sensor 10 may include other components such as, but not limited to, one or more sensors 26, camera 28, control switch 30, sync button 32, USB port 34, and rechargeable battery 36. Each of these components may be coupled by the bus 24 to other system components such as the processor 12 and memory 20.

Memory 20 can include a computer readable storage medium as described herein. Memory 20 can include computer system readable media in the form of volatile memory, such as random access memory (RAM) and/or cache memory. Memory 20 can additionally or alternatively include non-volatile memory, such as one or more of read only memory (ROM), flash memory, and non-removable magnetic storage devices. In such instances, each can be connected to bus 24 by one or more data media interfaces. As will be further depicted and described below, memory 20 may include at least one program product having a set (e.g., at least one) of program modules that are configured to carry out the functions of embodiments of the invention.

At least one program/utility, having a set (at least one) of program modules, may be stored in memory 20 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein. In embodiments, memory 20 includes an operating system 38 and the following program modules: voice control module 40, peer interaction module 42, cloud interaction module 44, one or more APIs 46, and a cognitive module 48.

In accordance with aspects of the invention, the voice control module 40 is configured to resolve voice commands received from a user via speaker 16, e.g., to determine an action to perform based on the voice command. In embodiments, voice control module 40 may also be configured to perform smart speech recognition as described herein, e.g., to determine an which particular user of plural registered users spoke the voice command received at speaker 16.

In accordance with aspects of the invention, the peer interaction module 42 is configured to coordinate communications and actions amongst plural smart sensors 10 that are connected as a system. For example, as described herein, peer interaction may include functions such as, but not limited to, comparing data from sensors 26 of plural smart sensors 10 to determine a location of a user relative to the plural smart sensors 10.

In accordance with aspects of the invention, the cloud interaction module 44 (also called the remote interaction module) is configured to coordinate communication between the smart sensor 10 and a cloud-based system, such as a cloud-based cognitive computing system. In embodiments, some functions are performed locally at the smart sensor and other functions are performed remotely at one or more cloud based-systems, and the cloud interaction module 44 manages sending data to and receiving data from the one or more cloud based-systems when performing such functions.

In accordance with aspects of the invention, the APIs 46 include one or more application program interfaces that are configured to permit the smart sensor 10 to interface with other smart devices. For example, the APIs 46 may include application program interfaces configured to permit the smart sensor 10 to send data to and receive data from smart appliances such as, but not limited to, televisions, thermostats, lighting systems, security systems, sprinkler/irrigation systems, health/medical monitoring devices (e.g., EKG machines, heart rate monitors, etc.). In this manner, the combination of the voice control module 40 and the APIs 46 provide the functionality of the smart sensor 10 controlling (e.g., sending control signals) to a smart appliance based on the speaker 16 of the smart sensor 10 receiving a voice command from a user.

In accordance with aspects of the invention, the cognitive module 48 is configured to perform cognitive analysis, the results of which may be used by the smart sensor 10 in generating an output (e.g., performing a function) in response to a user input. For example, and without limitation, the cognitive module 48 may be configured to perform at least one of tone analysis, speech rate analysis, and speech volume analysis based on a voice command received at the speaker 16 of the smart sensor 10.

In embodiments, the smart sensor 10 may include additional or fewer components (or modules) than those shown in FIG. 1. In embodiments, separate components (or modules) may be integrated into a single computing component or module. Additionally, or alternatively, a single component (or module) may be implemented as multiple computing components or modules.

FIGS. 2 and 3 show a front view and a side view, respectively, of an implementation of a smart sensor 10 in accordance with aspects of the invention. In embodiments, the smart sensor 10 includes a case 50 containing the components described with respect to FIG. 1 including at least one microphone 14, at least one speaker 16, sensors 26, camera 28, control switch 30, sync button 32, and USB port 34. In embodiments, as shown in FIG. 3, the power adapter 22 includes prongs that are configured to plug directly into an electrical outlet 52, e.g., in a wall 54 of a building. By plugging directly into the outlet 52, implementations of the invention avoid the disadvantages of an electrical power cord, such as unsightliness, tangles, and tripping hazard.

The at least one microphone 14 may be any number and arrangement of conventional and/or later developed devices that are configured to convert sound into an electrical signal. In embodiments, the at least one microphone 14 is configured to receive voice (e.g., spoken) input from a human user and to convert the voice input to electrical signals that are used by other components of the smart sensor 10.

The at least one speaker 16 may be any number and arrangement of conventional and/or later developed devices that are configured to convert an electrical signal into sound. In embodiments, the at least one speaker 16 is configured to provide audio output, e.g., in response to a user input received at the microphone 14.

In embodiments, the at least one sensor 26 includes a motion detector, such as a passive infrared sensor (PIR sensor), that is configured to detect the motion of an object (e.g., human, animal, etc.) within the field of view of the sensor. Additionally or alternatively, the at least one sensor 26 may include a distance determining sensor, such as a LiDAR (Light Detection and Ranging) sensor that is configured to detect and determine distance to an object using reflected light and/or an ultrasonic sensor that is configured to determine distance to an object using sound waves. In a preferred embodiment, the at least one sensor 26 comprises a PIR sensor and an ultrasonic sensor that are usable together to detect the presence of a user near the smart sensor 10 and determine a distance from the detected user to the smart sensor 10. In this manner, when plural smart sensors 10 are arranged in a system (e.g., in a home or office), the system uses data from the at least one sensor 26 of the plural smart sensors 10 to determine which one of the plural smart sensors 10 is closest to a user who speaks a command.

In accordance with aspects of the invention, the camera 28 may be any number and arrangement of conventional and/or later developed devices that are configured to convert light received via a lens into digital images. In embodiments, the camera 28 is a digital video camera that is configured to capture digital video data. In embodiments, the camera 28 comprises a wide angle lens such as a 120° wide angle lens or greater (e.g., a 120° to 180° lens). In this manner, the camera 28 is configured to capture video from a large portion of the room in which the smart sensor 10 is installed.

Still referring to FIGS. 2 and 3, the control switch 30 is a switch that a user can manipulate to selectively turn the smart sensor 10 ON and OFF (e.g., to selectively open and close a circuit that provides operating voltage to the system). The control switch 30 may include any conventional and/or later developed type of switch including but not limited to a toggle or dolly, a rocker, and a push-button switch.

In embodiments, the sync button 32 is a button that is configured to cause the smart sensor 10 to enter a sync mode which is used to setup the sensor with a network and/or a user device. For example, the sync button 32 may be a Wi-Fi Protected Setup (WPS) button or similar type of button that is usable to add (or sync) the smart sensor 10 with an existing network.

In embodiments, the USB port 34 is a Universal Serial Bus port for charging and/or data transfer. For example, a user may recharge a battery in their user device (e.g., smartphone) by connecting their user device to the smart sensor 10 via a cable that plugs into both the user device and the USB port 34. The USB port 34 may also be used to transfer data between the smart sensor 10 and a connected computing device, e.g., using a similar corded connection between the devices.

Figure 4:
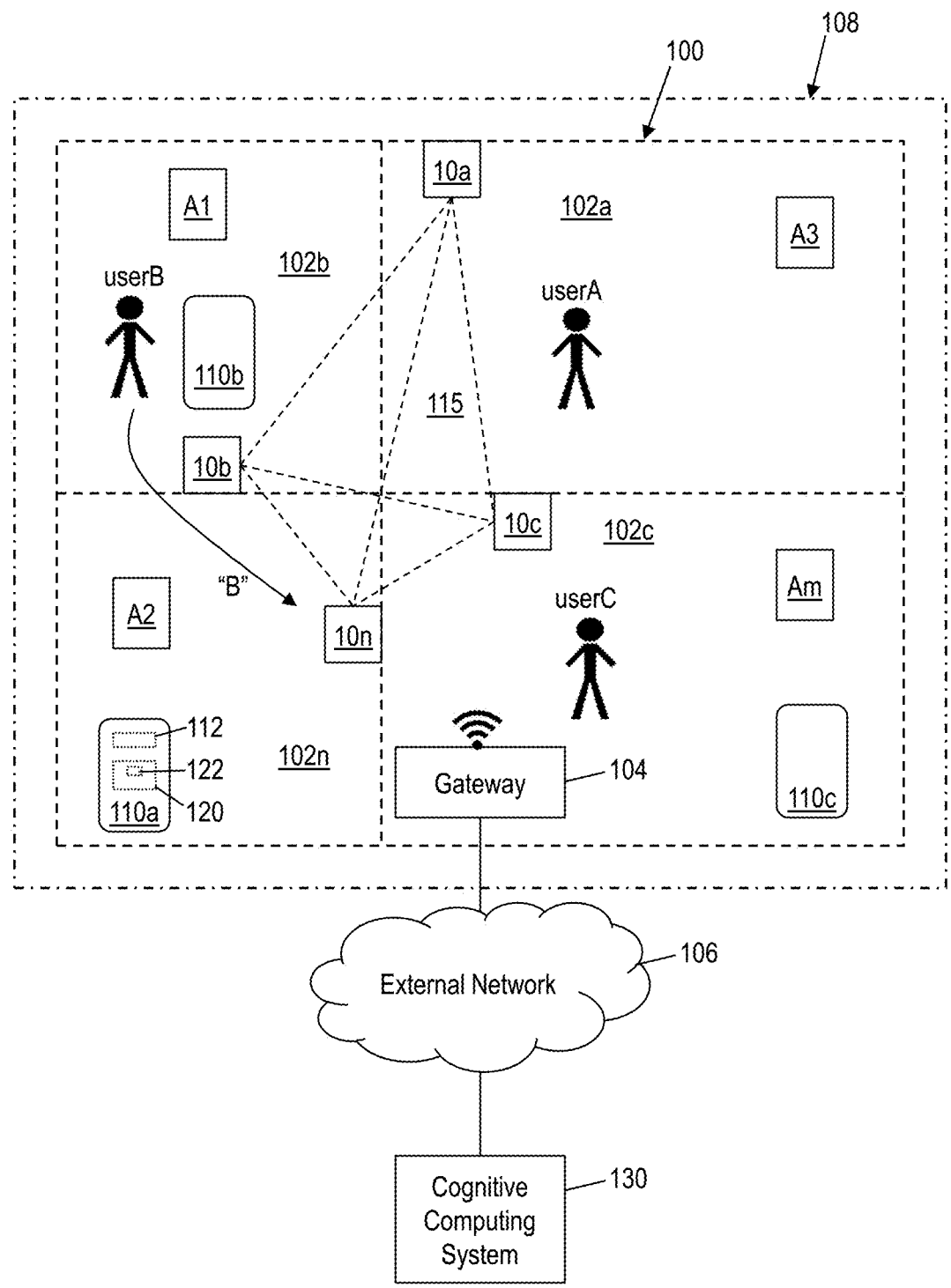
FIG. 4 shows a block diagram of a system in accordance with aspects of the invention.

FIG. 4 shows an exemplary environment comprising plural smart sensors 10a-n arranged in a system in accordance with aspects of the invention. The system may be deployed in a building 100 such as a house, apartment, office, hospital, etc. In embodiments, each one of the smart sensors 10a-n is plugged into an outlet in a respective room 102a-n of the building 100, e.g., using the power adapter 22 as described herein. The building 100 includes a gateway 104 that connects to an external network 106 (e.g., the Internet) and that provides a wireless local area network (LAN) generally depicted at 108. For example, the gateway 104 may comprise a router that provides wireless communication for the local network 108 in the rooms 102a-n of the building 100. Any number of smart appliances A1, A2, A3, . . . , Am may be connected to the local network 108. The appliances A1-m may include, without limitation, a television, thermostat, lighting system, security system, medical devices (e.g., monitors), etc.

According to aspects of the invention, the plural smart sensors 10a-n form a mesh network 115 that is part of or connected to the local network 108 provided by the gateway 104. In this manner, the smart sensors 10a-n may communicate with one another, and can also communicate with the appliances A1-m. In embodiments, the smart sensors 10a-n can interact with (e.g., issue commands to) one or more of the appliances A1-m via application program interfaces (APIs). In this manner, as described herein, the system is configured such that a user can control one or more of the appliances A1-m by issuing a voice command to one of the smart sensors 10a-n.

Still referring to FIG. 4, in embodiments, the system is configured to provide personalized interaction with plural different users (userA, userB, userC) each having their own user device 110a, 110b, 110c. Each user device 110a-c can comprise for example, and without limitation, any of a smartphone, tablet computer, laptop computer, wearable computer that can communicate with at least one of the smart sensors 10a-n via the network 108.

User device 110a, which may be representative of any of the user devices, is shown as having a processor 112, memory 120, and app 122, although it is understood that user device 110a may have additional components (e.g., input/output device(s), network interface, battery, etc.) The app 122 is an application program or other program module that provides an interface between the user device 110a and one or more of the smart sensors 10a-n. In accordance with aspects of the invention, the app 122 is configured to: permit a user (e.g., userA) to register the user device 110a with the system of smart sensors 10a-n; permit the registered user to control certain functionality of one or more of the smart sensors 10a-n; and expose certain user data stored on the user device 110a to one or more of the smart sensors 10a-n.

In embodiments, each user registers their user device with the system prior to using the system. Registration may be performed through the app 122 and may include: the user (e.g., userA) inputting credentials (e.g., username, password, etc.) via an interface of the app 122 to confirm that the user is a valid user and that the device is a valid device; and the user speaking into a microphone of the user device 110a to provide samples of their voice that are used to set up smart speech recognition as described herein.

In accordance with aspects of the invention, the system uses smart speech recognition to determine the identity of a person speaking a voice command that is received at one of the smart sensors. The smart speech recognition may be performed locally at the smart sensor, or remotely at a cloud-based server, or some combination of both. In the local implementation, the smart sensor receives audio data (e.g., the voice command) and the voice control module (e.g., module 40 of FIG. 1) determines the identity of the user. In the cloud server implementation, the smart sensor receives audio data (e.g., the voice command) and transmits the audio data via the local network to the cloud-based server, which performs the processing to determine the identity of the person speaking a voice command and returns the identity to the smart sensor. In both implementations, the system compares the received audio data (e.g., the voice command) to stored data associated with each registered user (e.g., voice samples provided during registration), and uses voice recognition techniques to determine which of the registered users provided the received audio data (e.g., the voice command). In this manner, the system determines which one user of a plurality of registered users uttered the voice command that was received at one of the smart sensors.

Any number of users and user devices may be used with the system. For example, in one implementation only a single user is registered with the system and interacts with the system at any given time. In another example, plural users are registered with the system and two or more of the registered users can simultaneously interact with the system. Moreover, although plural smart sensors 10a-n are shown in FIG. 4, implementations of the invention are not limited to using plural sensors. Instead, a single smart sensor may be used by single or plural registered users. For example, only one user might register their user device with one smart sensor, and this user may interact with the one smart sensor to perform functions described herein (e.g., make calls using the user's contacts, play music using the user's music library, control appliances, ask questions and receive answers, etc.). As another example, plural users might share a single smart sensor, e.g., by all registering their devices with the smart sensor and taking turns interacting with the smart sensor to perform functions described herein.

In the exemplary environment shown in FIG. 4, users userA, userB, userC have each registered their respective user devices 110a, 110b, 110c with the system of smart sensors 10a-n, and each of the user devices 110a-c is connected to the local network 108. Plural exemplary use cases will be described with reference to FIG. 4 to illustrate functionality of the system.

A first exemplary use case illustrates how the system may be configured to provide telephone call functionality that is personalized based on a user interacting with one of the smart sensors. In embodiments, the system may be configured to receive a voice command to make a telephone call, determine which user of the plural registered users uttered the voice command, access a contact list of the determined user to initiate the requested call, and conduct the call via one of the smart sensors. In this first use case, userA is in room 102a and speaks a voice command "call Dave." Smart sensor 10a receives the voice command via its microphone 14, and the voice control module 40 of smart sensor 10a uses smart speech recognition to determine that the voice command was uttered by userA. Based on determining the user is userA, the smart sensor 10a accesses userA's contact list on userA's registered device (e.g., user device 110a), finds Dave in userA's contact list, and initiates a telephone call to the telephone number for Dave from userA's contact list. The smart sensor 10a is configured to communicate with the user device 110a (via the local network 108) to cause the user device 110a to make the telephone call while playing the audio of the telephone call through the smart sensor 10a. For example, during the call, userA's voice is received at the microphone 14 of the smart sensor 10a and transmitted to the user device 110a, which transmits the voice data to Dave's end point. Conversely, Dave's voice data is received at the user device 110a, which transmits Dave's voice data to the smart sensor 10a, which plays Dave's voice data via its speaker 16.

In this first exemplary use case, userA need not be in the same room with the user device 110a during the telephone call. For example, userA may be in a first room (e.g., room 102a) and the user device 110a may be in a different room (e.g., room 102n). In embodiments, the smart sensor 10a communicates with the user device 110a via the local network 108, which advantageous provides a user the ability to control functions of their user device (e.g., conduct telephone calls, play music, etc.) via voice interaction with one of the smart sensors 10a-n in any room.

Still referring to the first exemplary use case, the system may be configured to simultaneously handle plural telephone calls for plural different users. For example, while userA is conducting a call with Dave by interacting with smart sensor 10a in room 102a, userC who is in room 102c with smart sensor 10c may speak a command "call Ethel." In this case, the smart sensor 10c receives the voice command via its microphone 14, and the voice control module 40 of smart sensor 10c uses smart speech recognition to determine that the voice command was uttered by userC. Based on determining the speaker is userC, the smart sensor 10c accesses userC's contact list on userC's registered device (e.g., user device 110c), finds Ethel in userC's contact list, and initiates a telephone call to the telephone number for Ethel from userC's contact list. In this manner, a first user (e.g., userA) may interact with a first smart sensor (e.g., smart sensor 10a) simultaneously while a second user (e.g., userC) interacts with a second smart sensor (e.g., smart sensor 10c), and the system can simultaneously provide personalized interactions for both users.

A second exemplary use case illustrates how the system may be configured to provide 'following' functionality to a user that is moving throughout a physical space in which plural smart sensors are installed. In embodiments, the system may be configured to receive a voice command to play music, determine a first smart sensor that is closest to the user, play the requested music via the first smart sensor, detect that the user moves to a location that is closer to a second smart sensor, and discontinue playing the music via the first smart sensor and begin playing the music via the second smart sensor based on the detecting.

In this second use case, userB is in room 102b and utters the voice command "play music." userB may be sufficiently close to plural ones of the smart sensors such that more than one of the smart sensors detects the received voice command via their respective microphones 14. For example, userB's voice command may be detected by each of smart sensors 10a, 10b, and 10n. In embodiments, based on receiving a voice command, the system is configured to determine which of the plural smart sensors in the system is closest to the user that uttered the command. According to aspects of the invention, each of the smart sensors that receive a command (e.g., smart sensors 10a, 10b, and 10n in this example) uses data from its respective sensors 26 to determine a distance to a user. For example, each of the smart sensors 10a, 10b, and 10n may use one or more of PIR sensor data, LiDAR sensor data, and ultrasonic sensor data to determine a physical distance from the respective smart sensor to the user. The smart sensors 10a, 10b, and 10n may utilize their peer interaction module 42 to communicate with each other (e.g., via the local network 108) to compare results to determine which of the smart sensors 10a, 10b, and 10n is closest to the user. In this example, the smart sensors 10a, 10b, and 10n determine that smart sensor 10b is closest to userB when userB utters the voice command "play music." Based on this determination, the smart sensor 10b plays music to satisfy the request. For example, based on identifying userB via smart speech recognition, the smart sensor 10b may access userB's registered device (e.g., user device 110b) and play music from the user device 110b via the speaker 16 of the smart sensor 10b.

Still referring to the second exemplary use case, userB may move (e.g., walk) from room 102b to room 102n (as depicted by arrow "B") while the music is playing via the speaker 16 of the smart sensor 10b. In embodiments, the system may be configured to detect that a user has moved from a first location to a second location and cause the music to follow the person to the second location. For example, the smart sensor 10b playing the music may use data from its sensors 26 (e.g., PIR, LiDAR, and/or ultrasonic) to determine that userB is moving away from the smart sensor 10b, and the smart sensor 10n may use data from its sensors 26 (e.g., PIR, LiDAR, and/or ultrasonic) to determine that userB is moving toward the smart sensor 10n. The smart sensors 10b and 10n may use their peer interaction modules 42 communicating via network 108 to compare the determined location of userB, and to determine when userB has moved closer to smart sensor 10n. In embodiments, based on determining that the userB has moved to a location that is closer to smart sensor 10n than to smart sensor 10b, the smart sensor 10b stops playing the music and the smart sensor 10n begins playing the same music via its speaker 16. The system can be configured to fade the music out of the first smart sensor (e.g., smart sensor 10b) and fade the music into the second smart sensor (e.g., smart sensor 10n).

The second exemplary use case is described with respect to playing music, but aspects of the invention may provide 'following' for other functions such as television, lights, thermostat, etc. For example, appliance A1 may be a first television and appliance A2 may be a second television. userB may utter a voice command to smart sensor 10b that causes smart sensor 10b to control appliance A1 (the first television) to play a particular show. For example, based on receiving the voice command, the smart sensor 10b may use one of the APIs 46 to issue a command to the appliance A1 (the first television) to play the requested show. Then, in a manner similar to that described with respect to the music 'following' use case, the system may be configured to stop playing the show on appliance A1 (the first television) and to begin playing the same show on appliance A2 (the second television) based on userB moving out of room 102b and into room 102n.

Still referring to FIG. 4, the system can be configured to use cognitive analysis in generating a response (e.g., an output) based on a user input. The cognitive analysis may be performed by a cognitive module 48 at the smart sensor, by a cloud-based cognitive computing system 130, or a combination of both. The cognitive analysis may comprise a tone analysis of the voice command to determine a tone of the user, and the output generated by the system in response to the voice command may be based at least in part on the determined tone of the user. For example, userA may utter the voice command "play music" and this voice command may be detected by the microphone 14 of smart sensor 10a. In this example, the system uses cognitive analysis, specifically tone analysis, to determine the tone of the uttered voice command as happy. Based on this determined tone, and based on identifying userA via smart speech recognition, the smart sensor 10a accesses userA's music library on the user device 110a and selects music that matches the determined tone. Specifically, in this example, the smart sensor 10a selects happy music from userA's music library on user device 110a based on the determined happy tone of the voice command, and plays the selected music via the speaker 16. In this manner, the output of the smart sensor 10a is not only personalized based on the user data (the user's own music library), but it is also cognitively personalized based on cognitive analysis of the command spoken by the user.

With continued reference to FIG. 4, the system may use cognitive analysis to control how the system outputs an audio response, e.g., a response to a user question. For example, userA may utter the question "what is the weather," which is detected by the microphone 14 of smart sensor 10a. In this example, the system uses cognitive analysis to determine at least one of speech rate (e.g., slow, medium, or fast) and speech volume (e.g., quiet, normal, or loud) of the detected question. Based on the cognitive analysis, when outputting an answer via its speaker 16, the smart sensor 10a may adjust the speech rate and/or speech volume of the outputted answer to match that determined for the question.

In accordance with aspects of the invention, the system may use cognitive analysis to determine user preferences from past interactions. For example, the system may store data regarding the television shows that a user has watched in the past. For example, userA might speak the voice command "turn on the television" and this command may be received via the microphone 14 of smart sensor 10a. Based on receiving this voice command, the system may determine using smart speech recognition that userA spoke the command and then analyze the user data associated with userA to determine userA's preferred show that corresponds to the current day (of the week) and time of the voice command. Upon making the determination, the smart sensor 10a may issue a command (e.g., via API 46) to the television that is determined as closest to userA to turn on and tune to the determined show. The data defining user preferences may be stored at any suitable device or combination of devices within in the environment.

In embodiments, when the cognitive analysis is performed by the cloud-based cognitive computing system 130, the smart sensor (e.g., smart sensor 10a) may utilize the cloud interaction module 44 (shown in FIG. 1) to send data to and receive data from the cloud-based cognitive computing system 130.

According to aspects of the invention, the system may be configured to provide natural language question and answering. For example, userA may speak a voice command in the form of a question that is received by the microphone 14 of smart sensor 10a. Based on receiving the question, the cloud interaction module 44 (shown in FIG. 1) may send data (e.g., data defining the question) to the cloud-based cognitive computing system 130, which uses conventional and/or later developed techniques to determine answer the question. In this example, the smart sensor 10a receives data from the cloud-based cognitive computing system 130 (e.g., data defining the determined answer) and plays (outputs) the answer to the question via its speaker 16.

In embodiments, the natural language question and answering may be personalized to the user that asks the question. For example, in the preceding example, the smart sensor 10a may use smart speech recognition to determine that userA is the user the asked the question that was received at the microphone 14. In embodiments, the data that the smart sensor 10a sends to the cloud-based cognitive computing system 130 may include credentials or other identifying information associated with userA. The cloud-based cognitive computing system 130 may use the credentials or other identifying information to tailor the answer that it determines in response to the question. For example, userA may be a doctor who has a professional medical subscription with the cloud-based cognitive computing system 130, the professional medical subscription being different (e.g., having different data and/or analytics) than a basic subscription with the cloud-based cognitive computing system 130. In embodiments, the cloud-based cognitive computing system 130 uses data and/or analytics associated with the professional medical subscription in determining an answer to the question that was received at the smart sensor 10a, and returns the answer to the smart sensor 10a for outputting to userA.

With continued reference to FIG. 4, in embodiments each user may use the app 122 to set user preferences, and the system may generate an output (e.g., perform a function) based at least in part on the user preferences. In embodiments, a smart sensor may be configured to: use smart speech recognition to determine a user that provides a voice input, access user preferences stored on the user device associated with the determined user, and format an output based on the user preferences.

A first exemplary user preference is a voice that is used by the smart sensors 10a-n when providing a response to a user. For example, each user may use the app 122 to select a voice from a list of predefined voices. Then, when a user interacts with one of the smart sensors, the smart sensor provides its spoken output using the voice selected by the user in the user preferences.

A second exemplary user preference is a vocabulary that is used by the smart sensors 10a-n when providing a response to a user. For example, each user may use the app 122 to select a vocabulary set from a list of plural predefined vocabulary sets. Then, when a user interacts with one of the smart sensors, the smart sensor provides its spoken output using the vocabulary set selected by the user in the user preferences.

A third exemplary user preference may be parental controls for sensitive content. For example, a parent may permit a minor to become registered user with the system so that the minor may enjoy the benefits of interacting with the system. However, the parent may wish to have the option of controlling content that the system presents to the minor. In embodiments, the app 122 permits a user to set user preferences that control types of content that is presented via the system. For example, the app 122 may permit a user to set a user preference regarding music, i.e., that music identified as containing explicit language will not be played by the system, whereas music identified as not containing explicit language can be played by the system. As another example, the app 122 may permit a user to set a user preference regarding search results content, i.e., the system will filter search results and/or answer based on explicit content when the system determines (using smart speech recognition) that a minor provided the voice command that generated the search results and/or answer. As another example, the app 122 may permit a user to set a user preference regarding television content, i.e., the system will not instruct a television to play an R-rated show or movie when the system determines (using smart speech recognition) that a minor provided the voice command to play the R-rated show or movie.

Figure 5:
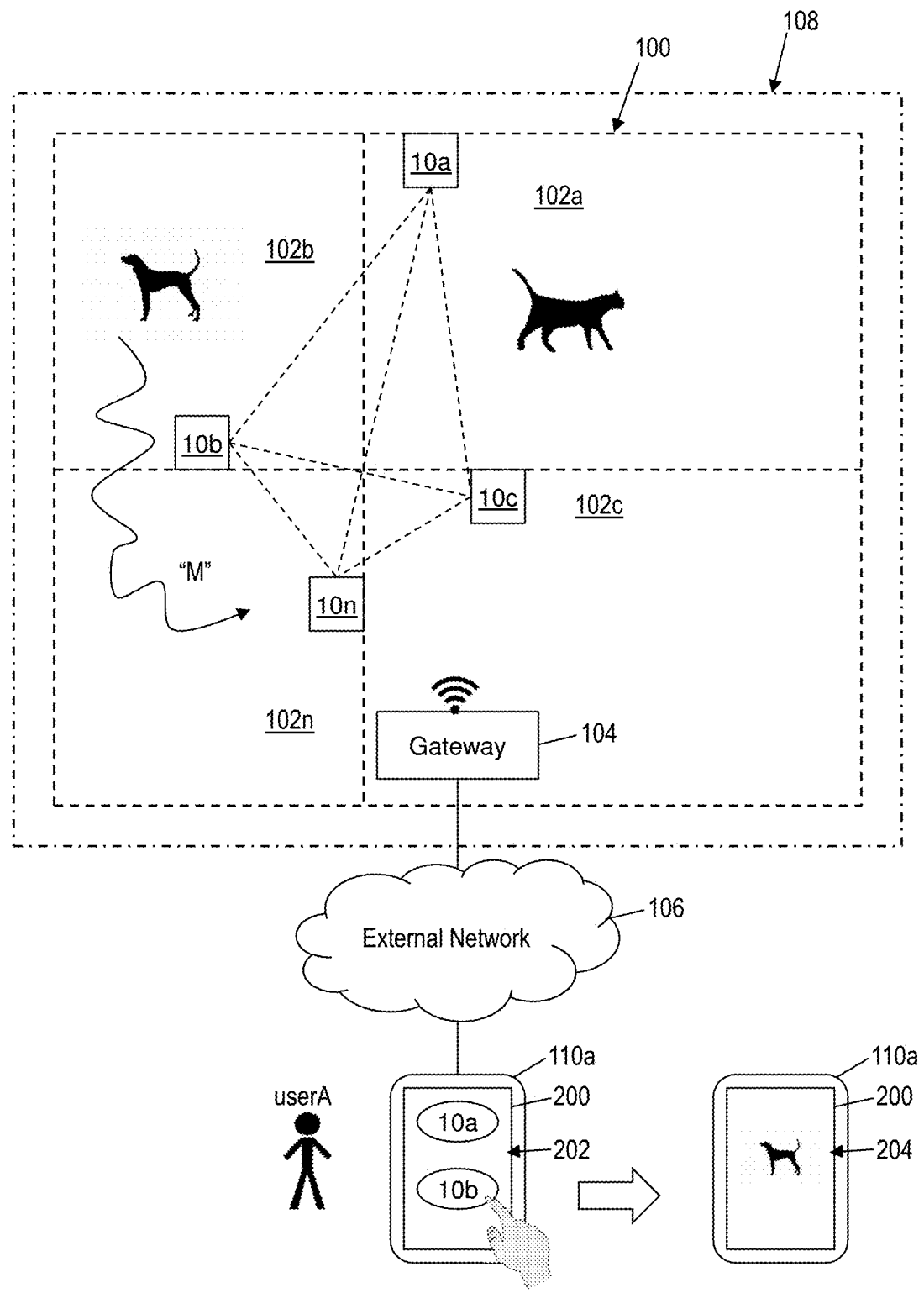
FIG. 5 shows a block diagram of a system in accordance with aspects of the invention.

FIG. 5 shows a block diagram of a system in accordance with aspects of the invention. The system shown in FIG. 5 may be similar to that of FIG. 4 in that is includes plural smart sensors 10a-n installed in rooms 102a-n of a building 100 in which a gateway 104 provides a local network 108. The implementation shown in FIG. 5 illustrates how a user may access data from the plural smart sensors when the user and their user device are remote from (e.g., external to) the local network.

As shown in FIG. 5, userA and user device 110a are at a location that is outside the local network 108, and in which the user device 110a is connected to the external network 106. In embodiments, the app on the user device 110a (e.g., app 122) is configured to access the one or more of the smart sensors 10a-n to provide data from the one or more of the smart sensors 10a-n while the user device 110a is not directly connected to the local network 108.

In the example shown in FIG. 5, the user device 110a may access data from the camera 28 of sensor 10a and from the camera 28 of sensor 10b, and may display the video data from these cameras on the display 200 of the user device 110a. In embodiments, each smart sensor 10a-n is configured to detect motion using sensors 26 and to communicate to the app 122 that motion has been detected. The app 122 may be configured to display an indication of each smart sensor that indicates motion detection, and to permit the user to select one of the indicated smart sensors to view video data captured by the camera of the selected one of the smart sensors. For example, in FIG. 5 the app 122 receives data from smart sensors 10a and 10b that each of these sensors detects motion. Based on this, the app 122 causes the user device 110a to display an indication 202 that smart sensors 10a and 10b each detect motion. The user may provide input to the user device 110a to select one of the indicated smart sensors (e.g., smart sensor 10b), at which point the app 122 obtains video data from the camera of the selected smart sensor 10b and causes the user device 110a to display the video data 204 on the display 200. In this manner, implementations of the invention may provide a video monitoring system, such as a pet monitor that a user can employ to check in their pet(s) while the user is away from their home.

Still referring to FIG. 5, based on detecting subsequent movement at an additional smart sensor, e.g., at smart sensor 10n when the object moves as shown by arrow "M", the app 122 may be configured to generate an update or alert at the user device 110a. In one example, the app 122 causes the user device 110a to return to a screen that displays an indication 202 of all smart sensors currently detecting motion, and wait for the user to select one of the indicated smart sensors. In another example, the app 122 automatically causes the user device to display video data from smart sensor 10n, e.g., in a 'following' as described herein. In this manner, implementations of the invention may provide a video monitoring system with following functionality.

Although FIG. 5 is described with respect to video monitoring, it is to be understood that aspects of the invention may be used in a similar manner to perform audio monitoring and or audio and video monitoring. For example, data obtained at the microphone 14 of one or more smart sensors 10a-n may be relayed to the user device 110a via the external network 106 and output at the user device 110a, e.g., in a manner similar to that described with respect to the video data.

Figure 6:
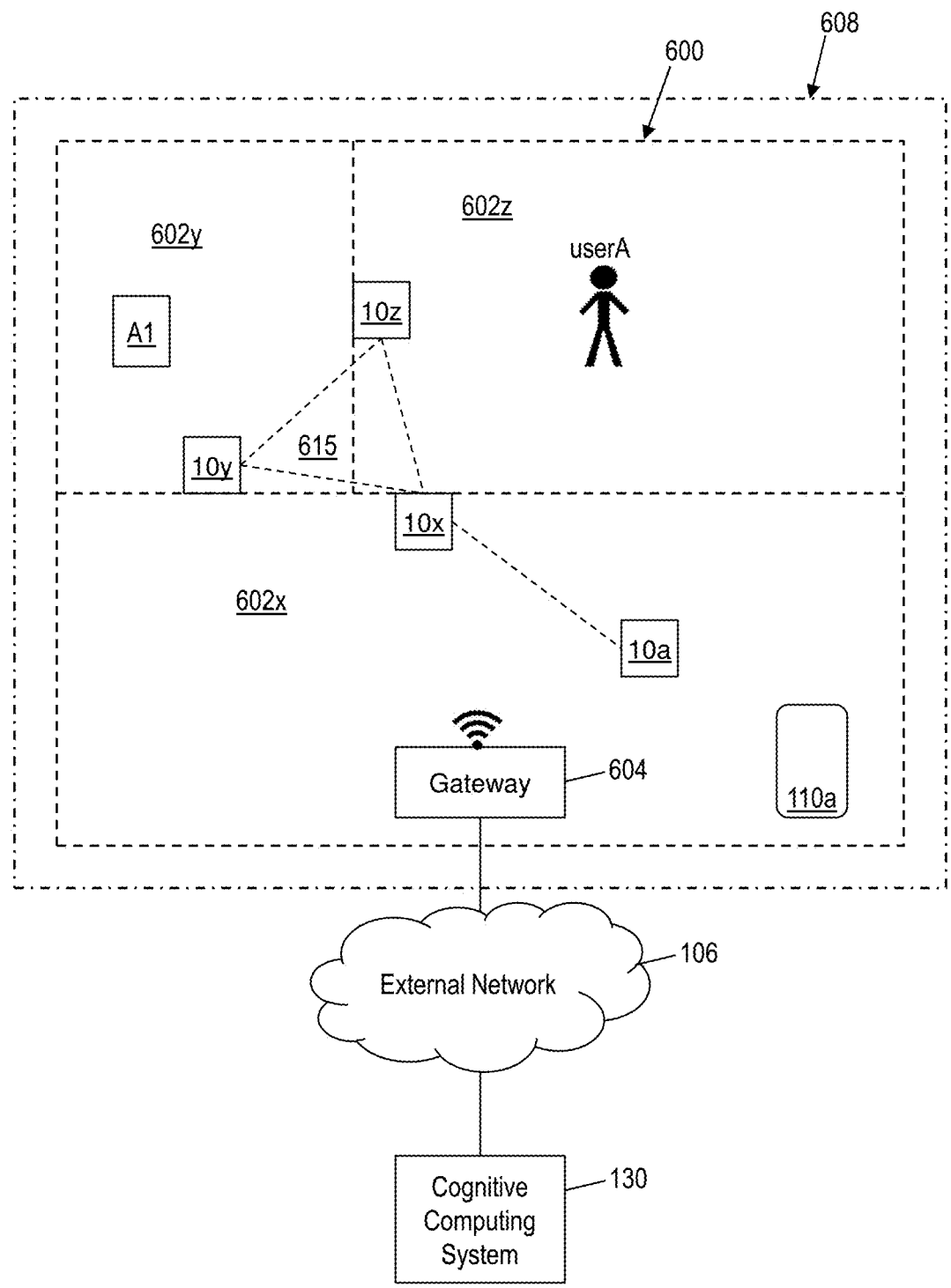
FIG. 6 shows a block diagram of a system in accordance with aspects of the invention.

FIG. 6 shows a block diagram of a system in accordance with aspects of the invention. FIG. 6 illustrates an aspect of the invention in which a smart sensor from a first system may be moved and operatively connected to a second system. In this manner, implementations of the invention provide a portable 'on-the-go' smart sensor that can be taken with a user and used alone or in other systems.

FIG. 6 shows a building 600 in which plural smart sensors 10x, 10y, 10z are arranged in rooms 602x, 602y, 602z. The building comprises a gateway 604 that provides a local network 608, e.g., in a manner similar to the gateway 104 of FIG. 4. The smart sensors 10x-z are connected in a mesh network 615, e.g. in a manner similar to that described with respect to FIG. 4.

In the exemplary scenario depicted in FIG. 6, userA has taken smart sensor 10a away from local network 108 at building 100 and transported the smart sensor 10a (e.g., carried it) and user device 110a into the range of local network 608 associated with building 600. The smart sensor 10a can operate on battery power from its battery 36 while it is in building 600, or may be plugged into an electrical outlet at building 600.

In the exemplary scenario depicted in FIG. 6, the mesh network 615 defined by smart sensors 10x-z represents a second mesh network that userA has permission to join. For example, the administrator of the mesh network 615 defined by smart sensors 10x-z may permit smart sensor 10a to connect to the mesh network 615. For example, the mesh network 115 of FIG. 4 may be that of userA's home, and the mesh network 615 of FIG. 6 may be that of a friend's house or a workplace.

In accordance with aspects of the invention, an individual smart sensor is configured to provide functionality when it connected to a second mesh network in the same manner that the smart sensor provides functionality when it connected to a first mesh network. For example, after the smart sensor 10a connected to the mesh network 615 via the local network 608, userA may utilize the smart sensor 10a to perform functions described with respect to FIG. 4. For example, userA may utter a voice command to any of the smart sensors 10a, 10x, 10y, 10z to make a telephone call, and the receiving smart sensor will access userA's user device 110a and initiate a call in a manner similar to that described with respect to FIG. 4. It is noted that userA need not be in the same room as smart sensor 10a and/or user device 110a. Instead, userA may speak a voice command to smart sensor 10z, and this receiving smart sensor 10z interacts with smart sensor 10a and/or user device 110a to provide an output based on userA's input.

Still referring to FIG. 6, as another example userA may utter a voice command to play music, and the system of smart sensors 10a, 10x, 10y, 10z will play music on a specified one or more of the smart sensors in a manner similar to that described with respect to FIG. 4. The cognitive computing system 130 may also be leveraged in FIG. 6 in a similar manner to that described with respect to FIG. 4 in providing cognitive analysis that is used in generating an output at one of the smart sensors 10a, 10x, 10y, 10z in response to a voice input from userA.

The environment depicted in FIG. 6 is particularly useful in an exemplary use case comprising a hospital setting. For example, the building 600 may be a hospital and each of the rooms 602x-z may be a patient room or an examination room that is outfitted with a respective smart sensor. In this example, userA may be a healthcare provider such as a doctor, nurse, etc. After initially registering the smart sensor 10a with the mesh network 615, the mesh network 615 and smart sensor 10a may be configured to cause the smart sensor 10a to automatically connect to the mesh network 615 based on the smart sensor 10a coming within range of the local network 608. In this example, the healthcare provider (e.g., userA) brings their own smart sensor 10a and user device 110a into the range of the local network 608, e.g., as they arrive for work. Once the smart sensor 10a is connected to the mesh network 615, the healthcare provider (e.g., userA) may leave their own smart sensor 10a and user device 110a in a first room 602x (e.g., their office) and utilize the functionality of the system while visiting patients in other rooms (e.g., rooms 602y, 602z). For example, the healthcare provider (e.g., userA) may make a telephone call or ask a question (for question and answer response) by voice interaction with any of the smart sensors 10y, 10z in the rooms 602y, 602z.

Additionally, the healthcare provider (e.g., userA) may carry their user device 110a and use it to monitor data of smart appliances in other rooms via the smart devices 10x-a of the mesh network 615. For example, mesh network 615 may interface with a heart monitor A1 connected to a patient in room 602y, and the app 122 of the user device 110a may be configured to permit the healthcare provider (e.g., userA) to visually view real-time data obtained from the heart monitor A1 even when the healthcare provider (e.g., userA) and the user device 110a are in a different room.

Figure 7:
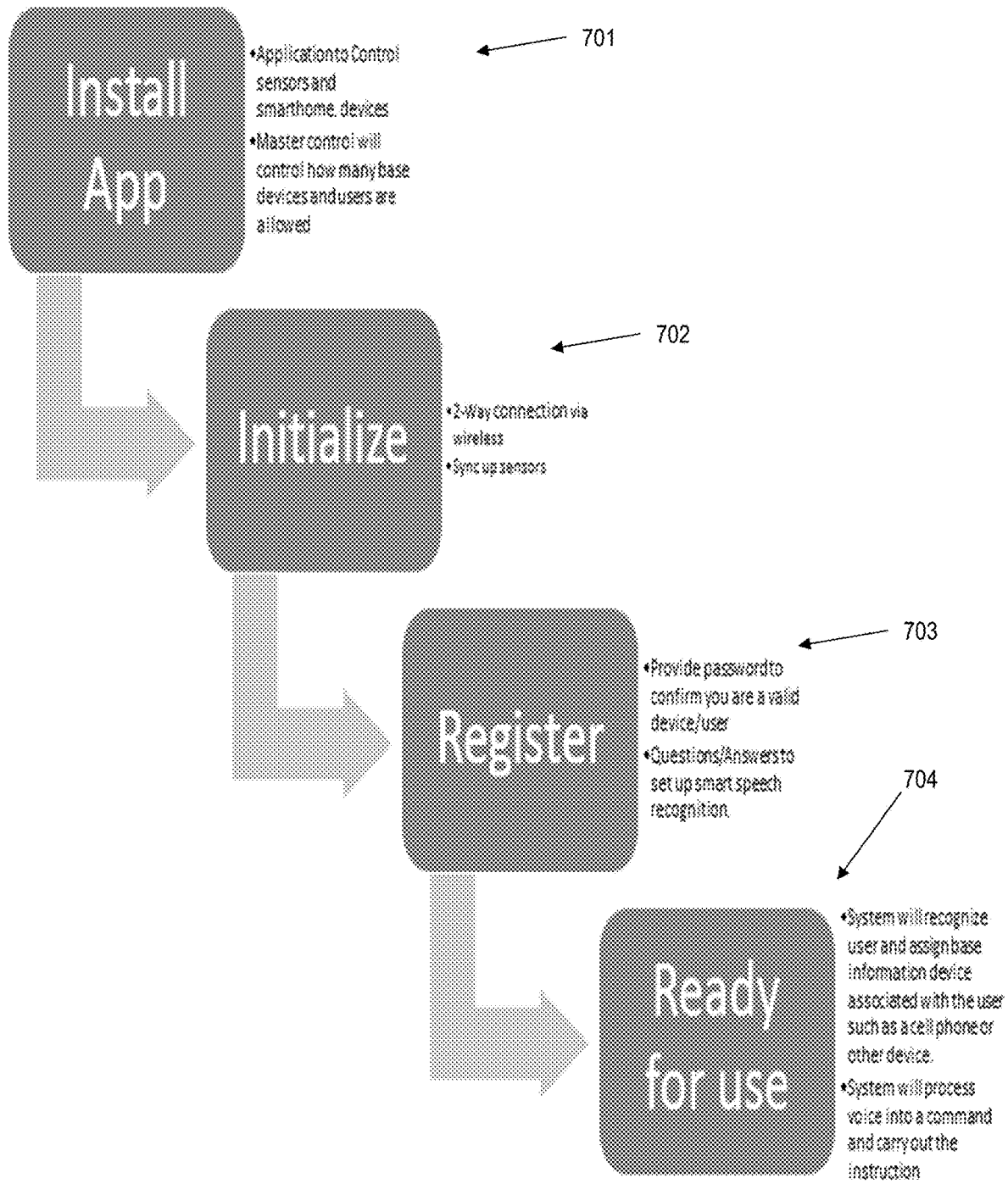
FIG. 7 shows a flowchart of an exemplary method in accordance with aspects of the invention.

FIG. 7 shows a flowchart of a method in accordance with aspects of the invention. Steps of the method of FIG. 7 may be performed in the system illustrated in any of FIGS. 4-6 and are described with reference to elements and steps described with respect to FIGS. 1-6.

At step 701, an app is installed on each user device that is to be used with the system. In embodiments, as described with respect to FIG. 4, an app 122 may be installed on each user device 110a-c. In accordance with aspects of the invention, the app 122 is configured to provide different types of accounts to different users. For example, the app 122 is configured to permit at least one user to register as an administrator (also called master control) and to permit at least one other user to register as a normal user. In embodiments, the administrator is provided with all the functionality of a normal user, and in addition is provided with administrative controls and privileges. For example, the administrator can control, via the app 122, how many user devices (e.g., user devices 110a-c) and how many users (e.g., userA, userB, userC) can register with the system. For example, the administrator can use the app 122 to invite a user to register with the system, to accept a request from a user to register with the system, to revoke a user's registration with the system, and to control what user data the system can access for each respective registered user.

At step 702, the app on the user device initializes the user device with the one or more smart sensors of the system. For example, the app 122 may be configured to cause the user device (e.g., user device 110a) to establish two-way communication with at least one smart sensor (e.g., smart sensor 10a) via wireless communication (e.g., via the local network 108). The app 122 may detect plural mesh networks, in which case step 702 may include displaying all detected mesh networks to the user via the user device and receiving input from the user of a selection of which of the mesh network to join. Step 702 may also include syncing each smart sensor in the selected mesh network to the user device, and syncing all of the smart sensor in the selected mesh network to one another (e.g., via peer interaction modules 42).

At step 703, the user of the user device registers with the mesh network. Step 703 may include the user entering credentials (e.g., password) via the app 122 to join the mesh network. The credentials may be provided to the user based on the administrator granting permission for this user to join the mesh network.

In embodiments, step 703 also includes the user providing voice samples to set up the smart speech recognition as described herein. For example, the app 122 may cause the user device to prompt the user to provide voice samples, e.g., by asking the user questions or instructing the user to state certain words, phrases, sentences, etc. The voice samples are received via the microphone 14 of one or more smart sensors in the mesh network and are stored for later use in smart speech recognition as described herein. The voice samples may be stored at any suitable location.

At step 704 the user interacts with one or more of the smart sensors in the mesh network. For example, the user may utter a voice command that is received by one or more of the smart sensors in the mesh network. In embodiments, and as described herein with respect to FIGS. 4-6, the system uses smart speech recognition to determine which user (of plural registered users) uttered the voice command, processes the voice command into an instruction, and carries out the instruction. In embodiments, the carrying out of the instruction may be based on user data that the system accesses based on determining which user uttered the voice command.

Figure 8:
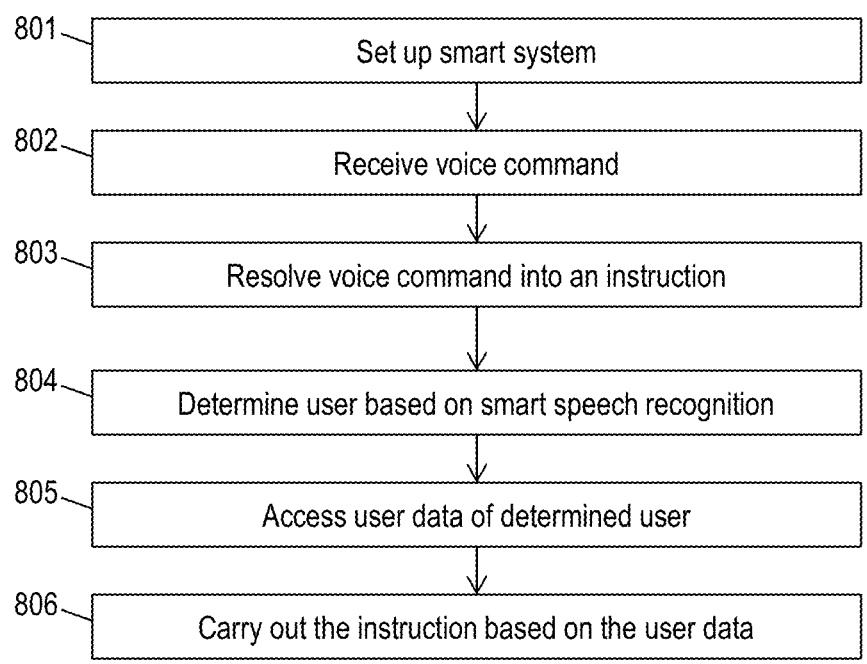
FIG. 8 shows a flowchart of an exemplary method in accordance with aspects of the invention.

FIG. 8 shows a flowchart of a method in accordance with aspects of the invention. Steps of the method of FIG. 8 may be performed in the system illustrated in any of FIGS. 4-6 and are described with reference to elements and steps described with respect to FIGS. 1-6.

At step 801, a smart system is set up. Step 801 may include plugging plural smart sensors 10 into different electrical outlets, and using the app 122 to define a mesh network containing the plural smart sensors 10, e.g., as described with respect to FIG. 4. Step 801 may also include registering one or more users and user devices with the mesh network, e.g., by the users performing the steps 701, 702, and 703. In some embodiments, step 801 may include a user connecting their smart sensor to an already existing mesh network, e.g., as described with respect to FIG. 6.

At step 802, a voice command is received by the smart system. In embodiments, and as described with respect to FIGS. 1-6, a user may utter (e.g., speak) a voice command that is detected by the microphone 14 of one or more smart sensors 10 in the mesh network of the smart system.

At step 803, the smart system resolves the voice command of step 802 into an instruction. In embodiments, and as described with respect to FIGS. 1-6, the voice control module 40 of the receiving smart sensor determines an action to perform based on the voice command that was received at step 802. Step 803 may be performed using techniques including but not limited to: converting speech to text, natural language processing of the text, and applying predefined rules based on the text and/or the natural language processing of the text.

At step 804, the smart systems determines a user that provided the voice command of step 802. In embodiments, and as described with respect to FIGS. 1-6, the system uses smart speech recognition to determine which particular user of plural registered users provided the voice command. The smart speech recognition may be performed locally at the smart sensor (e.g., by the voice control module 40), remotely at a cloud-based server (e.g., cognitive computing system 130), or some combination of both. In both implementations, the smart systems compares the received audio data (e.g., the voice command received at step 802) to stored data associated with each registered user (e.g., voice samples provided during registration, e.g., at step 703), and uses voice recognition techniques to determine which of the registered users provided the voice command.

At step 805, the smart system access user data associated with the determined user from step 804. In embodiments, and as described with respect to FIGS. 1-6, the system accesses a user device associated with the determined user. For example, the smart sensor may communicate with the user device via the mesh network 115 and/or the local network 108, and may access user data that is stored in the user device. The user data may include, for example and without limitation, at least one of a contact list, stored music, credentials for a music streaming service, user preferences received via the app 122 (e.g., voice, vocabulary, content controls), and credentials for a question and answer system. Other user data may also be used.

At step 806, the system carries out the instruction (from step 803) based on the user data (from step 805). In embodiments, and as described with respect to FIGS. 1-6, the system generates an output and/or performs a function that is based on both the instruction and the user data. For example, in the event the voice command was to make a telephone call, then step 806 may include the smart sensor causing the user device to initiate a telephone call based on accessing a contact list store on the user device, e.g., as described with respect to FIG. 4. In another example, in the event the voice command was to play music, then step 806 may include the smart sensor playing music based on a music library (or streaming service credentials) stored on the user device, e.g., as described with respect to FIG. 4. In another example, in the event the voice command was to turn on the television, then step 806 may include the smart sensor sending an instruction to a television based on preference data of the user, e.g., as described with respect to FIG. 4.

In accordance with aspects of the invention, step 806 may include performing a cognitive analysis and carrying out the instruction at least one part based on the cognitive analysis. The cognitive analysis may be performed locally at the smart sensor (e.g., by the cognitive module 48), remotely at a cloud-based server (e.g., cognitive computing system 130), or some combination of both. The cognitive analysis may include, for example, at least one of tone analysis, speech rate analysis, and speech volume analysis based on a voice command received at the speaker of the smart sensor.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as smart sensor 10 (as shown in FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as smart sensor 10 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A smart sensor, comprising:
   a computer processor;
   a microphone;
   at least one sensor; and
   a memory storing: an operating system; and a voice control module, wherein the voice control module is configured to:
resolve a voice command received by the microphone; and
determine an identity of a registered user from plural registered users based on the voice command;
the resolving the voice command includes determining an instruction;
the smart sensor is configured to access user data stored in a user device of the registered user based on the determining the identity of the registered user;
the smart sensor is configured to carry out the instruction based on the accessed user data;
the smart sensor is configured to detect a motion of the registered user towards an additional smart sensor using the at least one sensor; and
the smart sensor is configured to stop performing a function of the carried out instruction based on the detection of motion of the registered user.

2. The smart sensor of claim 1, wherein:
the memory stores a cognitive module that is configured to perform a cognitive analysis based on the voice command; and
the carrying out the instruction is performed based on the cognitive analysis.

3. The smart sensor of claim 1, wherein the memory stores a peer interaction module that is configured to communicate with the additional smart sensor via wireless communication in a mesh network.

4. The smart sensor of claim 1, wherein the memory stores a remote interaction module that communicates with a cognitive computing system for an answer to a question contained within the voice command in response to receiving the identity of the registered user.

5. The smart sensor of claim 4, wherein the memory stores a cognitive module that is configured to control, based upon the answer, at least one selected from a group consisting of: volume of the audio response produced by the speaker; speed of the audio response produced by the speaker; and vocabulary of the audio response produced by the speaker.

6. The smart sensor of claim 4, wherein the answer is determined using cognitive-based natural language question answering.

7. The smart sensor of claim 4, wherein the remote interaction module is configured to communicate with the cognitive computing system via an external network.

8. The smart sensor of claim 7, wherein the external network is the Internet and the cognitive computing system is a cloud-based cognitive computing system.

9. The smart sensor of claim 7, wherein:
the voice control module that is configured to identify the question in the voice command received at the microphone; and
the remote interaction module is configured to transmit the question to the cognitive computing system via the external network.

10. The smart sensor of claim 7, wherein the remote interaction module is configured to receive the answer to the question from the cognitive computing system by accessing the cognitive computing system based on a subscription tier of the registered user.

11. The smart sensor of claim 1, wherein the at least one sensor comprises at least one selected from the group consisting of:
a passive infrared sensor;
a LiDAR (Light Detection and Ranging) sensor; and
an ultrasonic sensor.

12. A smart system, comprising:
plural smart sensors connected in a wireless mesh network, wherein each of the smart sensors comprises:
a computer processor;
a microphone;
at least one sensor; and
a memory storing: an operating system; and a voice control module,
wherein the voice control module of a respective one of the smart sensors is configured to:
resolve a voice command to determine an instruction, wherein the voice command is received by the microphone of the respective one of the smart sensors; and
use smart speech recognition to determine an identity of a registered user from plural registered users based on the voice command;
wherein the smart system is configured to:
access user data stored in a user device of the registered user based on the determining the identity of the registered user; and
carry out the instruction based on the accessed user data; and
wherein a first one of the smart sensors performs a function based on the voice command from the registered user;
the first one of the smart sensors detects that the registered user moves towards a second one of the smart sensors; and
in response to detecting that the registered user moves towards the second one of the smart sensors, the first one of the smart sensors stops performing the function and the second one of the smart sensors starts performing the function.

13. The system of claim 12, wherein the first one of the smart sensors plays requested music based on receiving the voice command from the registered user.

14. The smart sensor according to claim 12, wherein the user data includes at least one selected from the group consisting of: a contact list; stored music; credentials for a music streaming service; user preferences; and credentials question and answer system.

15. A method of using a smart sensor system, comprising:
receiving, by a smart sensor, a voice command at a smart sensor;
resolving, by the smart sensor, the voice command to determine an instruction;
determining, by the smart sensor, a registered user from plural registered users based on smart speech recognition and the voice command;
accessing, by the smart sensor, user data on a user device based on the determining the registered user;
carrying out the instruction, by the smart sensor, based on the accessed user data; and
stopping, by the smart sensor, a function of the carried out instruction based on determining using at least one sensor that the registered user has moved towards another smart sensor.

16. The method of claim 15, further comprising performing a cognitive analysis based on the voice command.

17. A computer program product for using a smart sensor system, the computer program product comprising a computer readable storage medium having program instructions embodied therewith, the program instructions executable by a computer device to cause the computer device to:
receive a voice command at a smart sensor;
resolve the voice command to determine an instruction;

determine a registered user from plural registered users based on smart speech recognition and the voice command;

access user data on a user device based on the determining the registered user;

perform a cognitive analysis based on the voice command;

perform a function of the instruction at the smart sensor based on the accessed user data and the cognitive analysis;

stop performing the function of the instruction based on determining the registered user is moving away from the smart sensor.

18. The computer program product of claim 17, wherein the function is with respect to playing music.

19. A smart system, comprising:

plural smart sensors connected in a network, wherein each smart sensor of the plural smart sensors comprises at least one sensor and a memory storing: an operating system; and a voice control module, wherein the voice control module of a respective one of the smart sensors is configured to: resolve a voice command to determine an instruction; and use smart speech recognition to determine an identity of a user from plural users based on the voice command;

a first one of the smart sensors performs a function based on receiving the voice command;

the first one of the smart sensors using the at least one sensor and a second one of the smart sensors detect that the user moves to a location that is closer to the second one of the smart sensors than to the first one of the smart sensors; and in response to the detecting, the first one of the smart sensors stops performing the function and the second one of the smart sensors starts performing the function.

20. The smart system of claim 19, wherein the first one of the smart sensors is configured to perform the function based on the voice command of the user.

* * * * *